United States Patent [19]

Fiedrich

[11] Patent Number: 5,931,381
[45] Date of Patent: Aug. 3, 1999

[54] FOR RADIANT FLOOR, WALL AND CEILING HYDRONIC HEATING AND/OR COOLING SYSTEMS USING METAL PLATES THAT ARE HEATED OR COOLED BY ATTACHED TUBING THAT IS FED HOT OR COLD WATER, TECHNIQUES OF IMPROVING PERFORMANCE AND AVOIDING CONDENSATION WHEN COOLING

[76] Inventor: Joachim Fiedrich, 20 Red Pine Dr., Carlisle, Mass. 01741

[21] Appl. No.: 08/862,441

[22] Filed: May 23, 1997

[51] Int. Cl.[6] .................................................. F24D 5/10
[52] U.S. Cl. ............................................. 237/69; 165/49
[58] Field of Search ................................. 237/69; 165/49, 165/56

*Primary Examiner*—Henry A. Bennett
*Assistant Examiner*—Derek S. Boles

*Attorney, Agent, or Firm*—Robert T. Dunn, Esq.

[57] ABSTRACT

In radiant floor, wall and/or ceiling hydronic heating and/or cooling systems using metal radiation plates that are heated or cooled by attached tubing that is fed hot or cold water, where the system includes a plurality of aligned modular heating and/or cooling panels attached to the floor, wall and ceiling, each panel containing a metal radiation plate and each holds a length of the same tubing, the tubing being inserted into an accommodation in the panel and held therein in intimate thermal contact with the plate, and the assembly of panels with tubing inserted is covered with a finished floor, wall or ceiling and then hot water for heating or cold water for cooling is fed to the tubing, a thermal barrier is provided between the panels and the finished floor, wall or ceiling to: diminish or eliminate "hot spots" in the surface of the finished flooring, wall covering and ceiling covering during heating and "cold spots" during cooling; avoid condensation during cooling; and improve performance.

16 Claims, 6 Drawing Sheets

FOR RADIANT FLOOR, WALL AND CEILING HYDRONIC HEATING AND/OR COOLING SYSTEMS USING METAL PLATES THAT ARE HEATED OR COOLED BY ATTACHED TUBING THAT IS FED HOT OR COLD WATER, TECHNIQUES OF IMPROVING PERFORMANCE AND AVOIDING CONDENSATION WHEN COOLING

BACKGROUND OF THE INVENTION

This invention relates to hydronic heating and/or cooling systems for dwellings, offices, etc. having heating or cooling loops that consist of tubing or pipes fed hot or cold water, held in the floor, walls or ceiling of a room by panels that contain a metal radiation plate that: radiates heat to the room when the tubing is fed hot water, to heat the room; or absorbs heat from the room by radiation when the tubing is fed cold water, to cool the room; the tubing being secured in the panels in intimate thermal contact with the radiation plate and covered by a finished floor, wall or ceiling of the room. In particular, the installation includes special adaptations that improve performance for heating and cooling and avoid hot and/or cold spots on the surface of the finished floor, wall or ceiling and avoids condensation on the finished floor, wall or ceiling when cooling during humid conditions.

DRY MODULAR PANEL RADIANT HYDRONIC HEATING

Hydronic radiant floor heating (RFH), radiant wall heating (RWH) and radiant ceiling heating (RCH) are techniques of heating a room in a dwelling or commercial building for human and creature comfort. It is believed by many that hydronic radiant heating is the ideal way to warm the human body and superior to forced hot air heating.

Typical hydronic heating systems require a supply of hot water from a boiler and means for modulating the temperature of the water from the supply that is fed to the heating loops of the system, which include tubing and heating elements. This is particularly the case where modular panels are used in a dry installation in the floor for RFH, in the wall for RWH or in the ceiling for RCH. For example, if the supply water temperature is 180° F. for laundry, it must be modulated to about 100° F. (or lower) for RFH. A suitable system for reducing and controlling the supply water temperature for RFH, RWH and RCH is described in U.S. Pat. No. 5,119,988, issued Jun. 9, 1992, entitled "Hydronic Heating Water Temperature Control System, to Joachim Fiedrich, the inventor herein. In that patent a three-way, modulated diverting or by-pass valve is provided in the return line to the boiler, for diverting some of the cooler return water to the hot supply water to reduce the temperature of the supply water feeding the heating loop supply header. This is sometimes called temperature dilution and the diverting valve is modulated by a feedback signal derived from the diluted water temperature.

Modular panel heating elements for RFH, RWH and RCH are described in U.S. Pat. No. 5,292,065, issued Mar. 8, 1994, entitled "Radiant Floor And Wall Hydronic Heating Systems", to Joachim Fiedrich, the inventor herein. The panel elements include a metal radiation plate or sheet attached to two spaced apart boards for holding the tubing in the space between the boards in intimate thermal contact with the radiation plate, so that the plate is heated by conduction of heat from the tubing, and the plate has a substantial radiating surface that radiates heat to the room. Thermal conduction from the tubing to the plate and mechanical attachment of the tubing to the panel are insured by a resilient thermally conductive filler material as described in U.S. Pat. No. 5,579,996, issued Dec. 3, 1996, entitled "Radiant Floor And Wall Hydronic Heating Systems", also to Joachim Fiedrich, the inventor herein.

A mechanical adaptation that increases further the thermal path from the tubing to the plate consists of an undercut in each of the holding boards immediately adjacent the plate and the space for holding the tubing, that is filled with the thermally conductive filler material, providing a greater "thermal footprint" for the tubing on the plate. This mechanical adaptation is described in currently pending U.S. patent application Ser. No. 08/500,069, filed Jul. 10, 1995, entitled Radiant Floor And Wall Hydronic Heating System Tubing Attachment To Radiant Plate, also by Joachim Fiedrich, the inventor herein.

Hydronic heating systems using the modular panel heating elements described in the aforementioned U.S. Pat. Nos. 5,292,065 and 5,579,996 and in the aforementioned pending U.S. application Ser. No. 08/500,069 to cool as well as heat are described in currently pending U.S. patent application Ser. No. [not yet received], filed May 22, 1997, entitled "Hydronic Heating And/Or Cooling Systems Using Metal Radiation Plates That Are Heated Or Cooled By Attached Tubing Fed Hot Or Cold Water" by Joachim Fiedrich, the inventor herein. The systems described in that pending application include floor, wall and ceiling installations of modular panel elements and tubing. The floor installations are particularly effective for heating and can also be used for cooling; the ceiling installations are particularly effective for cooling and can also be used for heating; and the wall installations are effective for both heating and cooling.

Cooling is done by feeding cool water to the tubing to reduce the temperature of the radiation plate in the modular panel, to below room temperature so that heat is radiated from the room to the plate and conducted from the plate to the cool water in the tubing, heating the water slightly and the water is fed to a heat exchanger where it gives up the heat and is fed back to the panels. This circulation of cool water is continuous and may be a closed system. Systems for heating, systems for cooling and systems for doing both are described in that application.

In any of the systems described in the aforementioned U.S. patent application Ser. No. [not yet received], hot and/or cold spots on the surface of the finished floor, wall or ceiling that covers the modular panels sometimes occurs. These spots are identified as being hotter during heating or cooler during cooling than elsewhere on the finished surface, whereas uniform surface temperature is preferred. Cold spots on the finished covering during cooling can be particularly troublesome, because when the temperature of the cold spot falls below the dew point in the room, undesirable condensation occurs on the surface.

SUMMARY OF THE INVENTION

It is an object of the present invention to provide a method and means of improving the heat flow path between the tubing and the plate in said modular panel for RFH, RWH and RCH and, particularly for eliminating "hot spots" on the surface of the adjacent finished floor, wall or ceiling.

It is also an object of the present invention to provide a method and means of improving the heat flow path between the plate and the tubing in said modular panel for RFC, RWC and RCC and particularly for eliminating "cold spots" on the surface of the adjacent finished floor, wall or ceiling.

It is another object in conjunction with the above to provide a method and means of improving the heat flow path between the tubing and the plate in said modular panel used for heating and cooling for RFH, RWH, RWC and RCC and particularly for eliminating "hot spots" on the surface of the adjacent finished floor, wall or ceiling that occur during heating and for eliminating "cold spots" on the surface of the floor, wall or ceiling that occur during cooling.

Thus, the modular panel heating element described in the aforementioned U.S. Pat. Nos. 5,292,065 and 5,579,996 and in the aforementioned pending U.S. application Ser. No. 08/500,069 and [not yet received] can be used to cool as well as heat. The present invention describes several structures and methods which are adaptations of the modular panel elements and the installations thereof described in the aforementioned patents and pending patent applications, whereby undesired "hot spots" that occur during heating are reduced or eliminated and/or undesired "cold spots" that occur during cooling are reduced or eliminated.

According to particular embodiments of the present invention, the modular heating and/or cooling panels that contain the radiation plate are installed with tubing mounted therein carrying hot water for heating or cold water for cooling. The panels are arranged in line attached to the sub-flooring for RFH/RFC, the wall studs for RWH/RWC and the ceiling rafters, joists or strapping for RCH/RCC. Then the tubing is inserted into the aligned holding slots of the panels and may be secured therein by thermally conductive resilient filler material. One end of the tubing is fed water from a supply header and the other end feeds water to a return header. At that point, the installation is ready for a finished floor, wall or ceiling covering. However, before that, a thermal barrier is provided between the tubing and the finished floor, wall or ceiling to reduce direct thermal conduction between them and so prevent undesired "hot spots" during heating and "cold spots" during cooling.

Thus, RFH/RFC and RWH/RWC and RCC are installed "dry" (without wet concrete, cement or plaster embedding the tubing) and can be accessed later by simply removing the finished floor, wall or ceiling covering and the thermal barrier.

DESCRIPTION OF EMBODIMENTS OF THE INVENTION

First Type Modular Panel

Figures 1, 2:
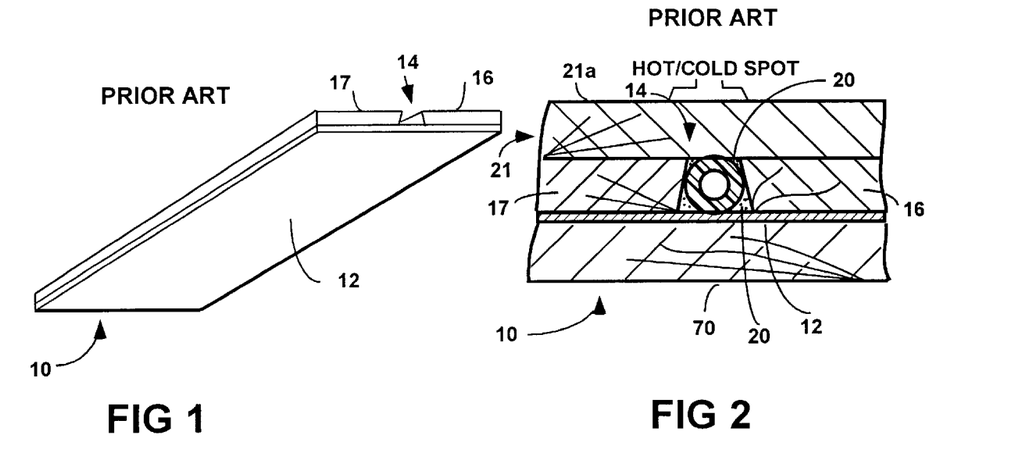
FIG. 1 (Prior Art) is a perspective view of the assembly of radiation plate and holder providing the first type of modular panel element, according to the aforementioned U.S. Patents and currently pending U.S. Patent Applications.
FIG. 2 (Prior Art) is an enlarged end view showing an assembly of the first type of panel elements on top of the sub-floor, the tubing inserted and secured thereto with compliant thermally conductive filler material and the finished flooring attached directly on top, as taught in the aforementioned U.S. Patents and pending U.S. Patent Applications, and illustrating where the "hot spots" and "cold spots" are likely to occur.

A typical modular panel of the first type, denoted 10, is shown in FIG. 1. It is composed of two lengths 16 and 17 of plywood, particle board or other rigid material that is not thermally conductive and, for some embodiments herein is the same thickness as the outside diameter of the tubing that it holds; but for other embodiments may be greater thickness to allow space for a thermal barrier between the tubing and the finished floor. The two lengths 16 and 17 of wood holder pieces hold the heat conducting radiation plate 12 against the top of sub-flooring 70 and provide a tubing containment space 14, the length thereof for holding the tubing 1 that is inserted against the plate.

As shown in FIG. 2, the tubing containment space 14 is the space between holder boards 16 and 17 and is closed on the bottom side by the plate 12 and so the tubing is inserted into this space from the top side of the space. Then the finished floor covering 21 is installed on top of the panels and tubing. The finished floor covering may be wood, ceramic tile, vinyl, carpet, etc. All such coverings are fully supported at all points by the panel and can be used. However, a "hot spot" during heating and/or a "cold spot" during cooling are likely to occur on the surface 21a of the covering above the tubing where shown in FIG. 2.

The radiation plate 12 is made of highly thermally conductive material such as aluminum, copper or steel. For example, it can be made of a relatively thin sheet of 0.008 gage, 3003 alloy aluminum and is attached to boards 16 and 17 by a suitable glue or epoxy or nailing, stapling or staking. For example, it may be attached by staking as taught in presently pending U.S. patent application Ser. No. 08/746, 458 filed Nov. 12, 1996, entitled "Apparatus And Method of Attaching Radiating Plate To Holders of Modular Unit For Radiant Floor And Wall Hydronic Heating Systems" by Joachim Fiedrich, the inventor herein.

First Embodiment—Panels of the First Type

Figure 3:
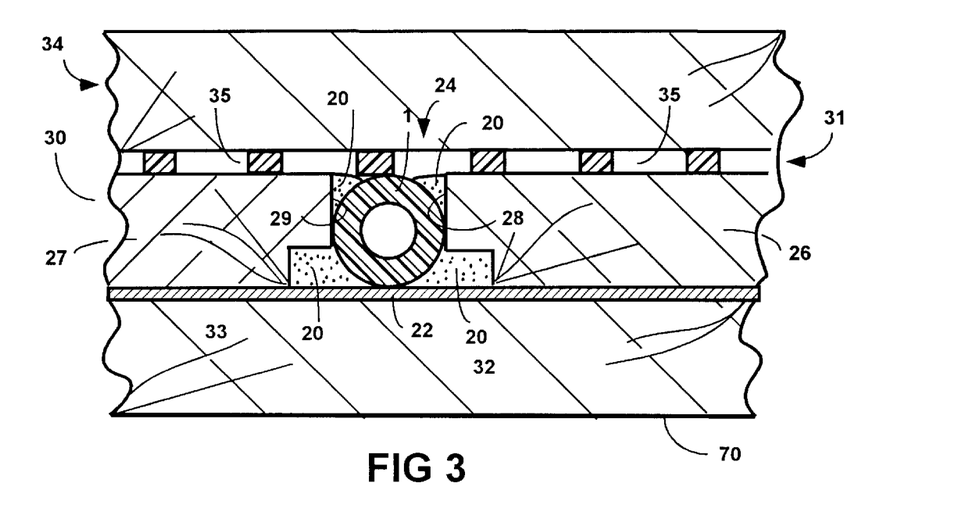
FIG. 3 is a further enlarged end view showing the first type of modular panel element installed on top of the sub-floor, provided with undercuts as taught in the aforementioned U.S. patent application Ser. No. 08/500,069, with thermally conductive filler material securing the inserted tubing against the radiation plate and the finished floor covering attached on top, and with a thermal barrier between the tubing and the finished floor covering, according to the first embodiment of the present invention.

FIG. 3 shows the first embodiment of the present invention using panels of the first type. As shown, the tubing containment space 24 of modular panel 30 is the space between holder boards 26 and 27 and resilient filler material 20 secures the inserted tubing 1 against the plate 22 over a broad area thereof provided by the undercuts 32 and 33

The inside edges of the holder boards 26 and 27 define the space 24 into which the tubing is inserted and held against the plate 22. Those edges 28 and 29 are preferably beveled slightly as shown and provide a tight fit for the tubing. The purpose of the bevel of edges 28 and 29 is to taper the entrance walls to space 24 so that it becomes slightly wider toward the plate. Thus, the tubing must be forced into the space from the open side thereof and once forced into the space is held firmly therein against plate 22 even without the filler material 20. The tubing is further held securely in space 24 in intimate thermal contact with the plate by the compliant thermally conductive filler material 20. According to the first embodiment of the present invention a grid structure 31 is provided between the installed panels and tubing and the finished floor covering 34 so that the direct contact area with the finished floor covering is reduced and trapped air spaces 35 are formed.

By reducing thermal conduction between the panels and tubing and the finished floor covering, the floor covering surface is less subject to variations in temperature across the surface. For example, for RFH, the temperature on the surface of the finished floor covering immediately over the tubing is likely to be significantly higher than elsewhere. The grid structure 31 creates trapped air spaces 35 between the panels (and tubing) and the finished floor covering and those air spaces are thermal barrier to direct thermal conduction. The result is that "hot spots" on the finished floor covering surface (shown in FIG. 2) are diminished or eliminated and the floor surface temperature is more even and comfortable.

A similar result is achieved for RFC where the temperature of the finished floor covering immediately over the tubing is likely to be significantly colder than elsewhere. Here again, the grid structure 31 creates trapped air spaces between the panels and tubing and the finished floor covering and the trapped air spaces are thermal barriers to direct thermal conduction. The result is that "cold spots" on the finished floor covering surface (shown in FIG. 2) are reduced, the floor surface temperature is more even and comfortable and condensation on the finished floor surface during humid conditions is less likely.

Second Embodiment—Panels of the First Type

Figure 4:
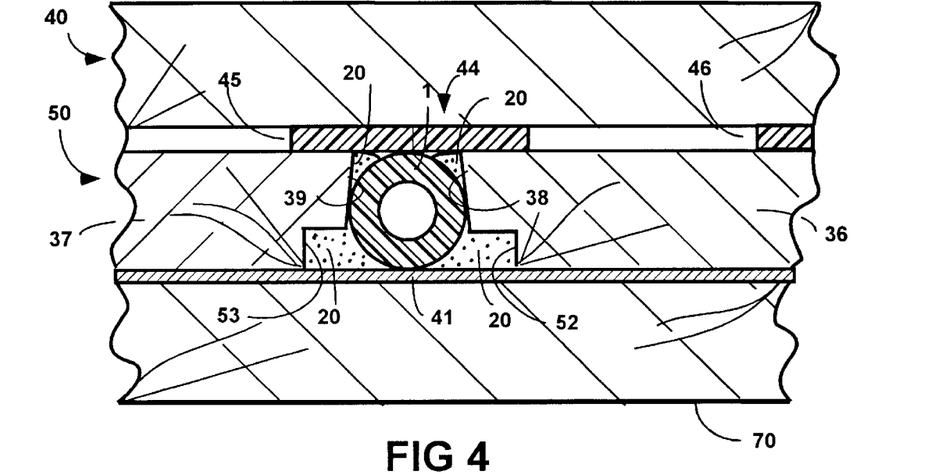
FIG. 4 is similar to FIG. 3 showing a modular panel element installed on top of the sub-floor, provided with the undercuts, with thermally conductive filler material securing the inserted tubing against the plate, the finished floor covering attached on top, and with a thermal barrier between the tubing and the finished floor covering according to the second embodiment of the present invention.

FIG. 4 shows a similar modular panel 50 in which the tubing containment space 44 between holder boards 36 and 37 is closed on the bottom side by the radiation plate 41, also for top of the sub-floor installation, and so the tubing 1 is inserted into this space from the top side. The filler material 20 secures the inserted tubing 1 against the plate 41 over a broad area thereof provided by the undercuts 42 and 43. In this second embodiment, direct thermal contact between the tubing and the finished floor covering 40 is reduced by thermal insulation strip 45 that covers the tubing and part of the holder boards immediately next to the tubing. The insulation strip 45 is a barrier to heat conduction directly from the tubing to the finished floor covering and so reduces hot spots when the system is used for RFH and reduces "cold spots" when the system is used for RFC.

Other strips 46 are like 45 may be provided between strips 42 for even mechanical support and need not be thermally insulating.

Third Embodiment—Panels of the First Type

Figure 5:
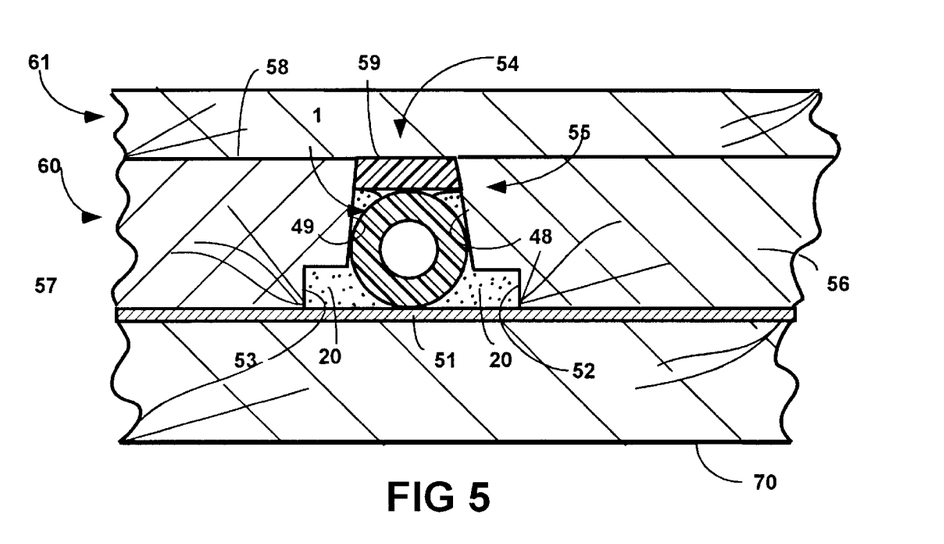
FIG. 5 is similar to FIGS. 3 and 4 showing a modular panel element installed on top of the sub-floor, provided with the undercuts, with thermally conductive filler material securing the inserted tubing against the plate and the finished floor covering attached on top, and with a thermal barrier between the tubing and the finished floor covering according to the third embodiment of the present invention.

FIG. 5 shows the third embodiment using a similar modular panel 60 in which the tubing containment space 54 is the space between holder boards 56 and 57 and is closed on the bottom side by radiation plate 51 for top of the sub-floor installation and so the tubing 1 must be inserted into this space from the open top side. The filler material 20 secures the inserted tubing 1 against the plate 51 over a broad area thereof provided by the undercuts 52 and 53.

In this embodiment, the holder boards 56 and 57 are substantially thicker than the diameter of the tubing so that there is a significant space 55 between the top of the tubing and the top surface 58 of the panel. The space 55 is preferably filled with a mechanically supportive thermal insulator 59 so that the surface 58 is even and mechanically supportive at all points thereof. Then the finished floor covering can be thin and/or flexible like vinyl or carpet. The thermal insulator 59 is a barrier to direct heat conduction between the tubing and the finished floor covering and provides mechanical support for the finished floor covering.

Fourth Embodiment—Panels of the First Type

Figure 6:
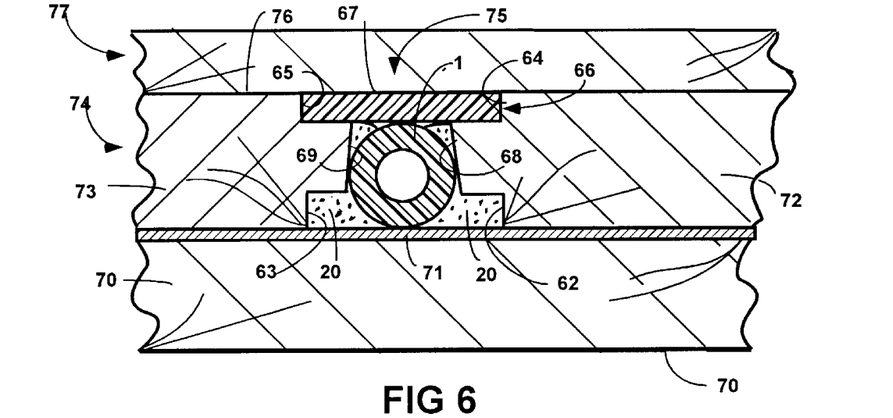
FIG. 6 is similar to FIGS. 3, 4 and 5, provided with the undercuts, with thermally conductive filler material securing the inserted tubing against the plate and the finished floor covering attached on top, and with a thermal barrier between the tubing and the finished floor covering according to the fourth embodiment of the present invention.

FIG. 6 shows the fourth embodiment using a similar modular panel 74 in which the tubing containment space 75 is the space between holder boards 72 and 73 and is closed on the bottom side by radiation plate 71 for top of the sub-floor installation and so the tubing 1 must be inserted into this space from the open top side. The filler material 20 secures the inserted tubing 1 against the plate 71 over a broad area thereof provided by the undercuts 62 and 63.

In this embodiment, the holder boards 72 and 73 are substantially thicker than the diameter of the tubing so that there is a significant longitudinal space 66 defined by walls 64 and 65 between the top of the tubing and the top surface 76 of the panel. The space 66 contains thermal insulation strip 67 that is a thermal barrier between the tubing 1 and the finished floor covering 77 and also provides mechanical support even with panel surface 76 for the floor covering at all points thereof. Then the finished floor covering can be thin and/or flexible like vinyl or carpet.

Fifth Embodiment—Panel of the First Type

Figure 7:
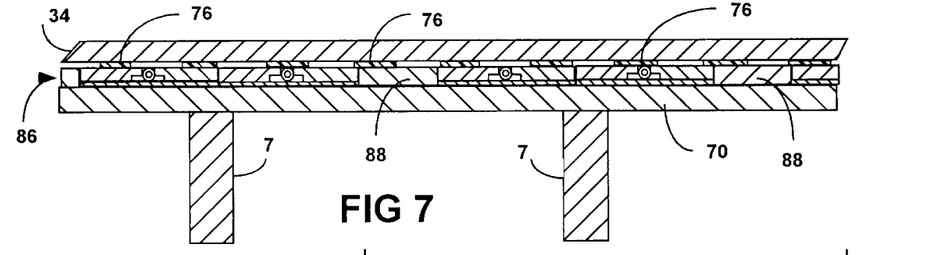
FIG. 7 is an edge view of an RFH/RFC installation on top of the floor showing several of the first type of modular panels arranged side by side and the tubing inserted as described and with thermal barriers thereon to inhibit direct thermal conduction between the tubing and the finished floor covering according to the fifth embodiment of the present invention.
Figure 8:
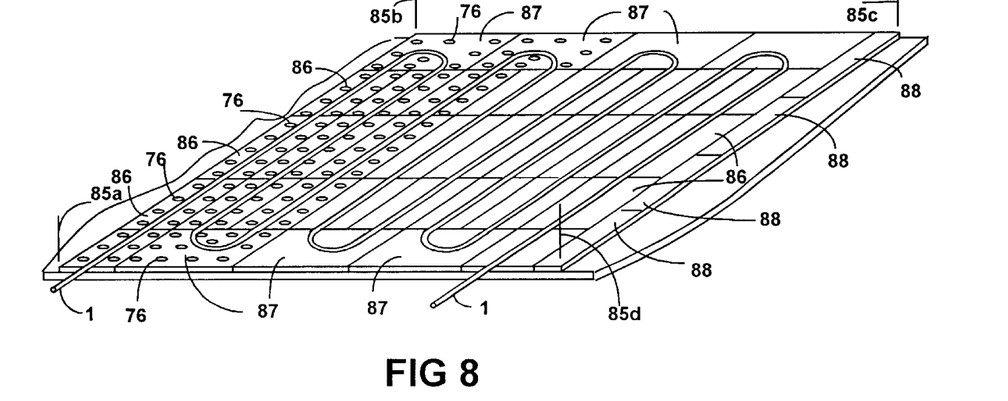
FIG. 8 is a perspective view of the RFH/RFC installation of FIG. 7 showing several of the first type of modular panels of different kinds (some for straight runs of tubing and some for turns of the tubing), arranged side by side and end to end on top of the sub-floor, the tubing installed, the thermal barrier structure of the fifth embodiment installed and ready for installation of the finished floor covering.

This embodiment shown in FIGS. 7 and 8 uses panels such as 30 (FIG. 3) or 50 (FIG. 4) and an array of small spacers 76 distributed evenly on top of the panels to provide an even distribution of trapped air spaces between the installed panels and tubing and the finished floor covering. The spacers need not be highly thermally insulating and can be made of wood. It is preferred that they not be placed directly over the tubing and be distributed evenly to provide even mechanical support for the finished floor covering.

FIG. 7 is an end view of an RFH/RFC installation of the modular panels 86 on top of the sub-floor 70, showing several modular panels arranged side by side and end to end on the sub-flooring, on an area thereof in a room. Fill boards 88 between the modular panels bring the surface of the installation even throughout for the finished floor covering 34.

FIG. 8 is a perspective view of the same room. showing several of the modular tubing holding boards 86 and 87 of different kinds, arranged side by side and end to end on the sub-floor 70 of the room over an area of the floor defined by vertical corner lines 85*a* to 85*c*. The modular panels hold tubing 1 as a continuous length laid down serpentine fashion from panel to panel, embedded in the holding spaces of the modular panels and held securely therein by the space structure itself and the filler material 20 therein.

Panels of the Second Type

Figures 9, 10, 11:
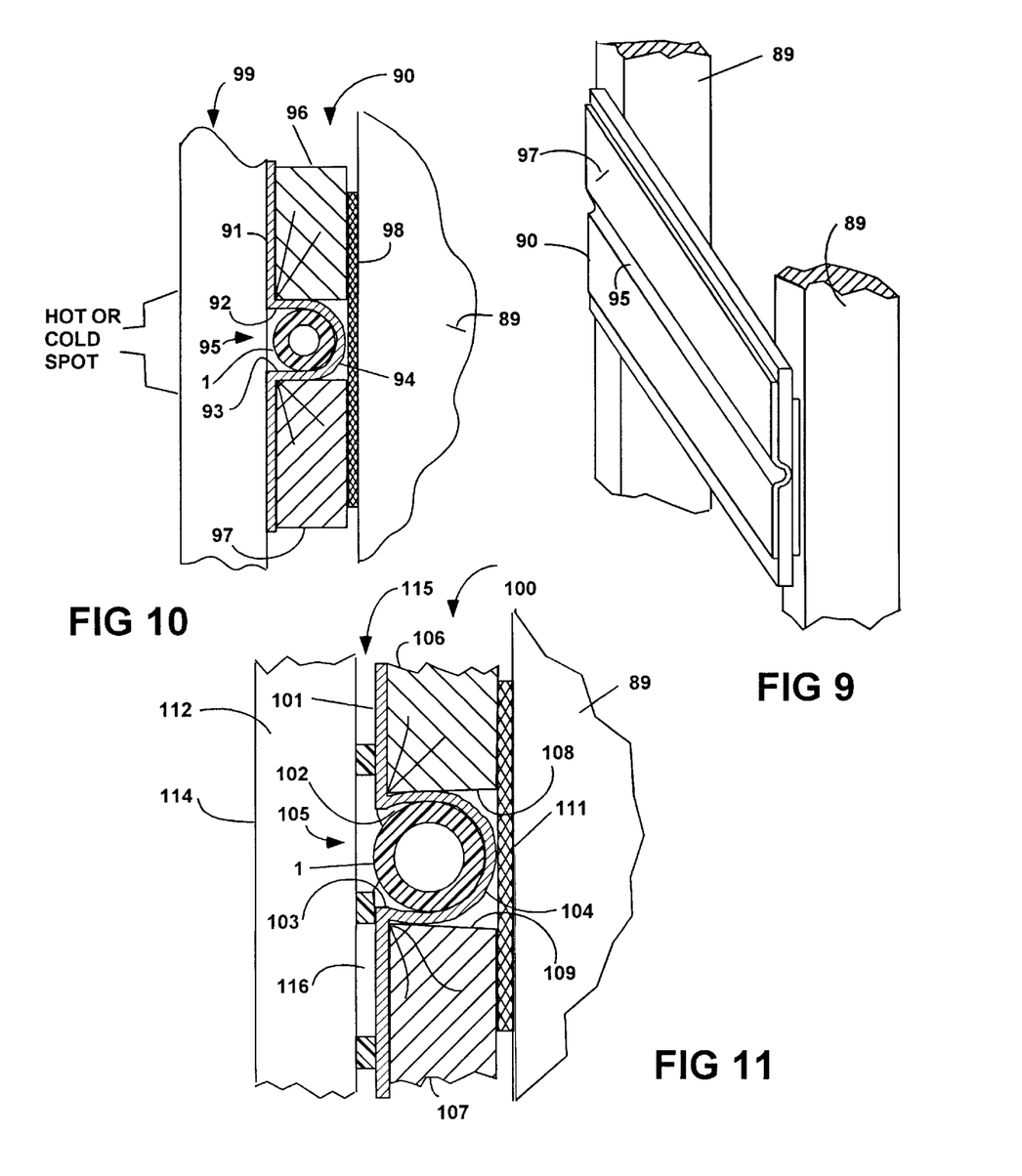
FIG. 9 (Prior Art) is a perspective view of the second type of modular panel element that is preferred for use in walls and ceilings, because the radiation plate thereof is insulated from the inside of the wall or ceiling by the plate holder boards of the panel, the panel being installed horizontally across the wall studs.
FIG. 10 (Prior Art) is an enlarged end view of the second type of modular panel installed as shown in FIG. 9, with the tubing inserted in the slot in the radiation plate, and the finished wall covering attached directly to the panel, and illustrating where the "hot spots" and "cold spots" are likely to occur on the surface of the finished wall covering.
FIG. 11 is a further enlarged end view showing the second type of modular panel element installed on wall studs for RWH/RWC or on ceiling rafters for RCH/RCC, with resilient thermally conductive filler material securing the inserted tubing in the radiation plate slot and the finished wall or ceiling covering attached, and with a thermal barrier between the tubing and the finished covering according to the sixth embodiment of the present invention.

A panel of the second type is shown in FIGS. 9 to 10. A horizontal installation of the panels and tubing on the studs 89 of a wall is illustrated in these Figures and the installation is completed when the finished wall covering 99 is attached to the panels.

The panel 90 is an assembly of a radiation plate 91 and holding boards 96 and 97, which may be plywood, particle board or other rigid material, about the same thickness as the outside diameter of the tubing 1 that is inserted into it. The two boards 96 and 97 support the radiation plate 91, which has a uniform longitudinal slot 95 the length thereof and the tubing fits snugly into the slot. The plate and slot can be made of a unitary piece of sheet metal bent to form slot 94 having sides 92 and 93 and bottom 94. As shown in FIGS. 9 and 10, the plate slot 95 fits between the spaced apart boards 96 and 97 and defines a loop, which is as deep as the thickness of the boards and in which the tubing 1 fits at installation. The plate is made of highly thermally conductive material such as aluminum, copper or steel. For example, it can be made of a sheet as thin as 0.008 gauge, 3003 alloy aluminum; and is attached to sleepers 31 and 32 by a suitable glue or epoxy or by nailing stapling or staking.

The slot 95 formed in such a sheet of aluminum can be distorted as the panels are handled. To avoid this, a piece of reinforcing mat 98 is attached to both sleeper pieces, bridging the space and so insuring a degree of lateral dimensional stability of the panel. The mat 36 may be fiberglass or other strong flexible thermally insulating material that is attached by glue, epoxy, staples, etc. to the boards as shown. The completed modular panel 90, shown in FIGS. 9 and 10 is substantially rigid longitudinally and can flex slightly along slot 95.

Sixth Embodiment—Panels of the Second Type

FIG. 11 shows the sixth embodiment of the present invention using panels of the second type. The panel 100 is an assembly of a radiation plate 101 and holding boards 106 and 107, which are about the same thickness as the outside diameter of the tubing 1 that is inserted into longitudinal slot 105 of the plate. The two boards 106 and 107 support the radiation plate 101 and the tubing fits snugly into slot 105. The plate and slot can be made of a unitary piece of sheet metal bent to form slot 105 having sides 102 and 103 and bottom 104.

As shown, the plate slot 105 fits between the spaced apart boards 106 and 107 and defines a loop, which is as deep as the thickness of the boards and in which the tubing 1 fits at installation. A piece of reinforcing mat 111 is attached to both boards 106 and 107, bridging the space and so insuring lateral dimensional stability of the panel and so the completed modular panel is substantially rigid longitudinally and can flex slightly along slot 105.

The inside edges 108 and 109 of the holder boards 106 and 107, respectively, define the space into which the plate slot 105 is inserted and held to receive the tubing. Those edges 108 and 109 are preferably beveled slightly as shown and provide a tight fit for the tubing inside the plate slot. The bevel tapers the entrance walls to the space between the boards so that it becomes slightly wider toward the bottom of the slot. Thus, the tubing must be forced into the slot from the open side thereof and once forced in is held firmly therein and is further secured by the filler material 20.

According to this sixth embodiment a grid structure 115 is provided between the installed panels and tubing and the finished wall covering 112 so that direct thermal contact of the tubing with the finished wall covering is reduced and trapped air spaces 116 are formed.

By reducing thermal conduction between the tubing and the finished wall covering, the wall covering surface 114 has less temperature variation across it. For example, for RWH and RCH, the temperature on the surface of the finished covering immediately over the tubing is likely to be significantly higher than elsewhere. The grid structure creates trapped air spaces 116 are thermal barrier to direct thermal conduction. The result is that "hot spots" on the finished wall or ceiling covering surface are diminished or eliminated and the surface temperature thereof is more even and comfortable.

A similar result is achieved for RWC and RCC where the temperature of the finished covering immediately over the tubing is likely to be significantly colder than elsewhere. Here again, the grid structure 111 creates trapped air spaces 116 between the panels and tubing and the finished covering and the trapped air spaces are thermal barriers to direct thermal conduction. The result is that "cold spots" on the finished covering surface are reduced, the surface temperature is more even and comfortable and condensation on the surface during humid conditions is less likely.

Seventh Embodiment—Panels of the Second Type

Figure 12:
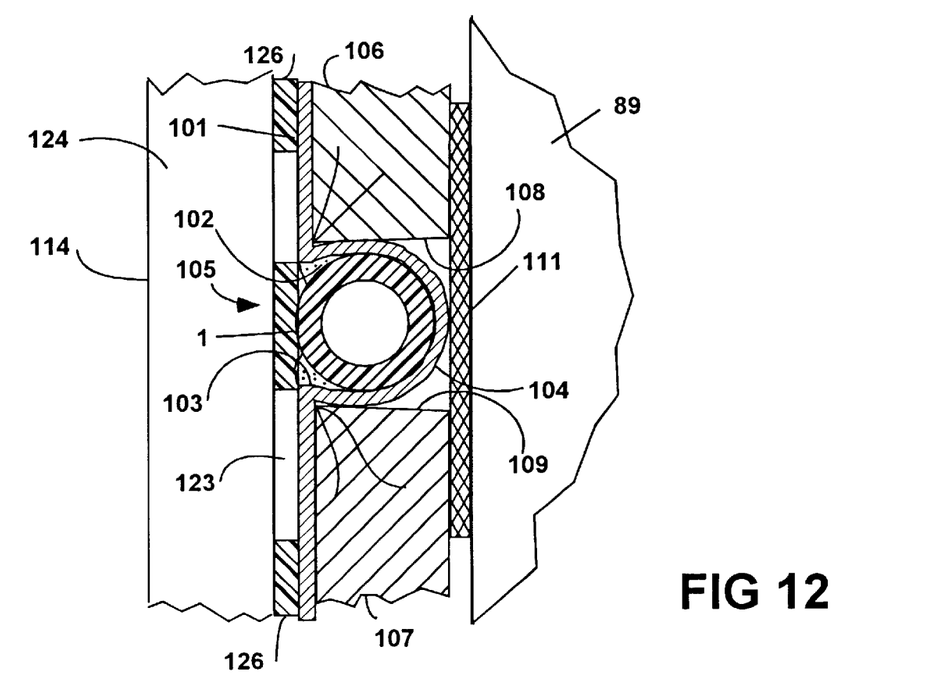
FIG. 12 is like FIG. 11 and with a thermal barrier between the tubing and the finished wall or ceiling covering according to the seventh embodiment of the present invention.

FIG. 12 shows the seventh embodiment of the present invention using panels of the second type. Here the panel is the same as panel 100 is the sixth embodiment (FIG. 11) and all reference numbers on the panel with tubing 1 inserted and secured with compliant thermally conductive filler material 20 are the same as in FIG. 11 and so that part of the description hereinabove with reference to FIG. 11 applies also to FIG. 12.

According to this seventh embodiment, direct thermal contact between the tubing and the finished floor covering 122 is reduced by thermal insulation strip 125 that covers the tubing and part of the holder boards immediately next to the tubing. The insulation strip 125 is a barrier to heat conduction directly from the tubing to the finished floor covering 122

Other strips 126 like 125 may be provided for even mechanical support and need not be thermally insulating. By reducing thermal conduction between the tubing and the finished wall covering, the wall covering surface 124 has less temperature variation across it. For example, for RWH and RCH, the temperature on the surface of the finished covering immediately over the tubing is likely to be significantly higher than elsewhere. The strips also create trapped air spaces 123 that are thermal barriers to direct thermal conduction. The result is that "hot spots" on the finished wall or ceiling covering surface 124 are diminished or eliminated and the surface temperature thereof is more even and comfortable.

A similar result is achieved for RWC and RCC where the temperature of the finished covering immediately over the tubing is likely to be significantly colder than elsewhere. Here again, the strips create trapped air spaces 123 between the panels and tubing and the finished covering and the trapped air spaces are thermal barriers to direct thermal conduction and the result is that "cold spots" on the finished covering surface are reduced, the surface temperature is more even and comfortable and condensation on the surface during humid conditions is less likely.

Eighth Embodiment—Panels of the Second Type

Figure 13:
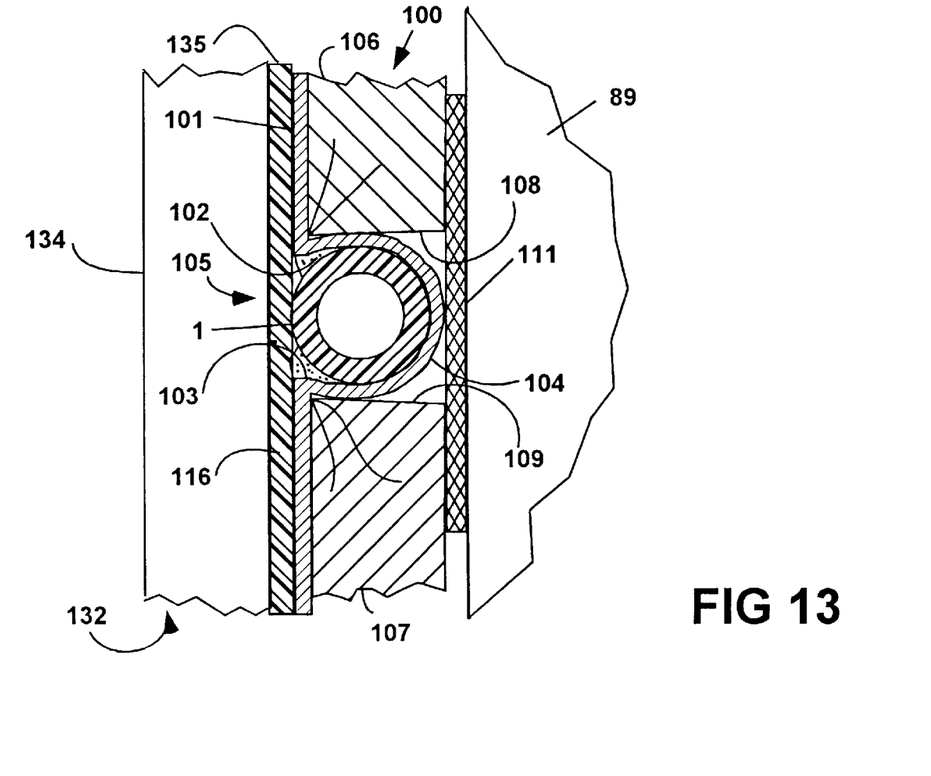
FIG. 13 is like FIGS. 11 and 12 and with a thermal barrier between the tubing and the finished wall or ceiling covering according to the eighth embodiment of the present invention.

FIG. 13 shows the seventh embodiment of the present invention using panels of the second type. Here the panel is the same as panel 100 is the sixth and seventh embodiment (FIGS. 11 and 12) and all reference numbers on the panel with tubing 1 inserted and secured with compliant thermally conductive filler material 20 are the same as in those Figures and that part of the description herein with reference thereto applies also to FIG. 13.

According to this eighth embodiment, direct thermal contact between the tubing and the finished floor covering 132 is reduced by uniform blanket of thermal insulation 135 that covers the entire installation of panels and tubing on the wall or ceiling. The insulation blanket strip 125 is a barrier to heat conduction directly from the tubing to the finished floor covering 122

Other strips 126 like 125 may be provided for even mechanical support and need not be thermally insulating. By reducing thermal conduction between the tubing and the finished wall covering, the wall covering surface 124 has less temperature variation across it. For example, for RWH and RCH, the temperature on the surface of the finished covering immediately over the tubing is likely to be significantly higher than elsewhere. The strips also create trapped air spaces 123 that are thermal barriers to direct thermal conduction. The result is that "hot spots" on the finished wall or ceiling covering surface 124 are diminished or eliminated and the surface temperature thereof is more even and comfortable.

A similar result is achieved for RWC and RCC where the temperature of the finished covering immediately over the tubing is likely to be significantly colder than elsewhere. Here again, the strips create trapped air spaces 123 between the panels and tubing and the finished covering and the trapped air spaces are thermal barriers to direct thermal conduction and the result is that "cold spots" on the finished covering surface are reduced, the surface temperature is more even and comfortable and condensation on the surface during humid conditions is less likely.

RWH/RWC—Panels and Tubing Horizontal Over Studs

Figure 14:
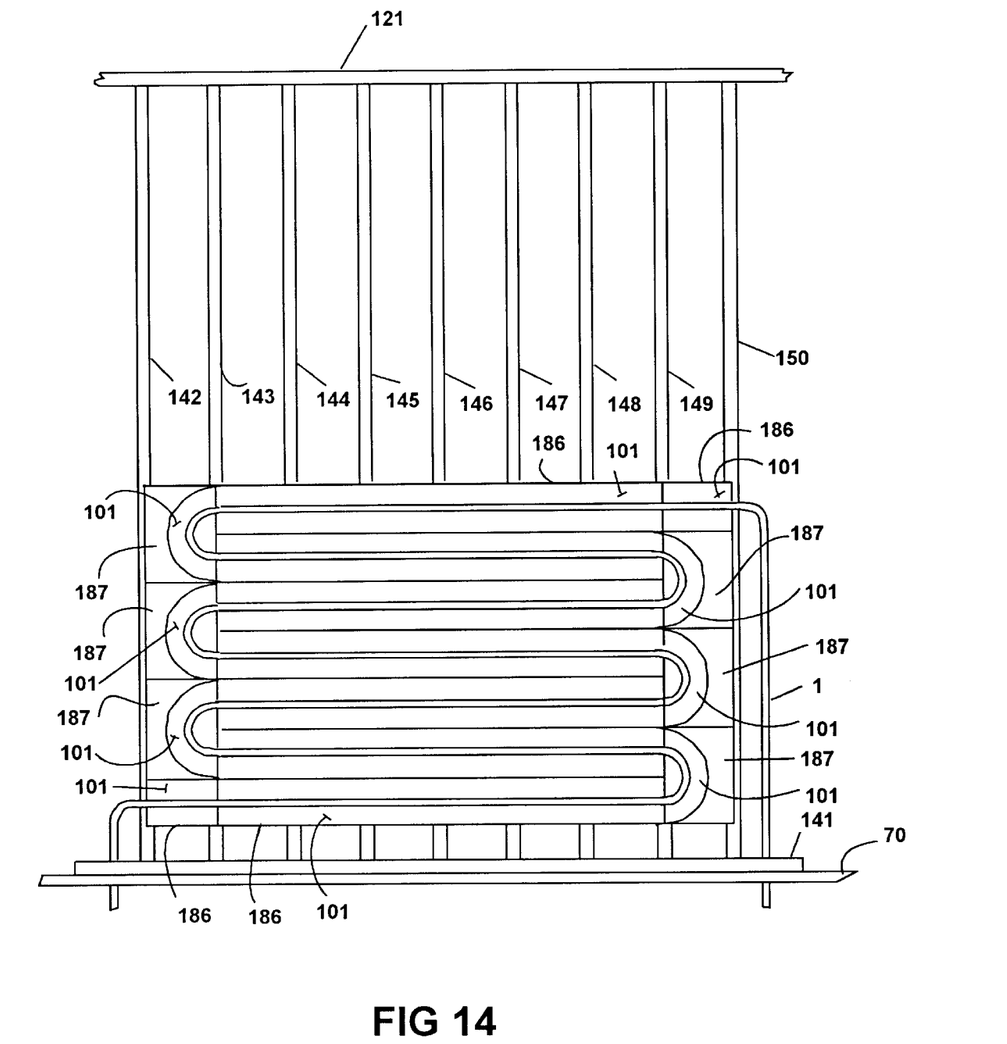
FIG. 14 is a front view of the RWH/RWC installation of any of FIGS. 11, 12 or 13 showing the wall sole plate, studs and top plate with several horizontal courses of the panels and tubing ready for installation of the thermal barrier and then the finished wall covering.

A typical wood frame construction wall structure is shown in FIG. 14 and denoted 140. It includes a wall sole plate 141, studs 142 to 150 and top plate 121 with several of the straight run modular panels 186 (like panel 100 in FIGS. 11 to 13) and U turn modular panels 187 (serving the same function as 180 degree panels 87 in FIG. 8), arranged side by side and end to end on the studs, providing a horizontal arrangement of several passes of the tubing across the studs and ready for covering by a finished wall covering.

RCH/RCC—Panels and Tubing Across Rafters, Joists, Etc.

Radiant hydronic cooling described herein is effective when installed in the ceiling, because the cooled air against the ceiling falls to the floor creating a convection flow that is favorable to providing even cooling throughout the room. In typical wood frame construction the ceiling of a room before the finished ceiling is installed is bare rafters, joists or strapping. Such a ceiling installation would be essentially the same as the wall installation shown in FIG. 14, except it would be on the rafters, joists, etc. of the ceiling instead of the wall studs 99 as in FIG. 14.

Compliant Thermally Conductive Filler Material

The compliant filler material 20 around the tubing held in the tubing holding space in any of the embodiments herein is applied to the space before the tubing is inserted or forced into the space. A purpose of the filler material is to hold the tubing in the space as an adhesive, while at the same time allowing the tubing to expand and contract longitudinally within the space of successive modular pieces that hold a length of tubing at installation. The tubing must be free to expand and contract, while the modular pieces are fixed by staples, nails, screws, etc. to the sub-floor, wall studs or ceiling rafters. Another purpose of the filler material is to reduce noise created by expansions and contractions of the tubing in the space. Yet another and important purpose is to provide a medium of thermal conduction from the tubing to the plate. A suitable filler material for any of these purposes is silicone rubber.

A convenient form of silicone rubber that can be used in the installations described herein is available commercially as a sealant or a caulking in viscous liquid form, usually dispensed from a tube by simply forcing it out of a nozzle on the tube. Such a sealant/caulking is usually a prepared mix of silicone dioxide, methanol and ammonia. A commercial source of this sealant/caulking mix is a General Electric product called SILICONE II that remains resilient for many years after it is applied.

CONCLUSIONS

While the invention described herein is described in connection with several preferred embodiments, it will be understood that it is not intended to limit the invention to those embodiments. It is intended to cover all alternatives, modifications, equivalents and variations of those embodiments and their features as may be made by those skilled in the art within the spirit and scope of the invention as defined by the appended claims.

I claim:

1. A hydronic heating system having a source of hot supply water and a reservoir of cooler return water, a supply water line from said source, a return water line to said reservoir and one or more heating loops through which water flows from said supply line to said return line, said heating loop including a heating element that is a length of tubing that conducts water from said supply line to said return line and said length of tubing is mounted in a floor, wall or ceiling of a room heated by said system by RFH, RWH or RCH, respectively, of said room, the improvement comprising:

(a) a highly thermally conductive radiation plate having length, width and thickness and a radiating surface, mounted in said room floor, wall or ceiling, parallel thereto and covered by said room finished floor, wall or ceiling, herein called said finished surface covering thereof, (b) a plate support of two spaced apart boards having surfaces and edges and providing between adjacent edges thereof an elongated space in which said length of tubing is held against said plate in intimate thermal contact therewith between said plate and said finished surface covering, (c) said elongated space being defined by said boards adjacent edges, said plate and an open side, (d) said tubing being inserted into said space through said open side thereof, (e) said boards adjacent edges are undercut so that said space is substantially wider at said plate than at said open side thereof and (f) a compliant thermally conductive filler material fills around said tubing between said tubing and said plate and between said tubing and said plate support along the width of said third side of said space provided by said plate, (g) whereby said plate is heated by conduction of heat from said tubing and radiates heat to said room and (h) means providing a direct thermal conduction barrier between said tubing and said finished surface covering, (i) whereby excessively high finished surface covering temperature immediately adjacent said tubing is avoided.

2. A hydronic cooling system having a source of cold supply water and a reservoir or warmer return water, a supply water line from said source, a return water line to said reservoir and one or more cooling loops through which water flows from said supply line to said return line, said cooling loop including a cooling element that is a length of tubing that conducts water from said supply line to said return line and said length of tubing is mounted in a floor, wall or ceiling of a room cooled by said system by RFC, RWC or RCC, respectively, the improvement comprising:

(a) a highly thermally conductive radiation plate having length, width and thickness and a radiating surface, mounted in said room floor, wall or ceiling, parallel thereto and covered by said room finished floor, wall or ceiling, herein called said finished surface covering thereof, (b) a plate support of two spaced apart boards having surfaces and edges and providing between adjacent edges thereof an elongated space in which said length of tubing is held against said plate in intimate thermal contact therewith between said plate and said finished surface covering, (c) said elongated space being defined by said boards adjacent edges, said plate and an open side, (d) said tubing being inserted into said space through said open side thereof, (e) said boards adjacent edges are undercut so that said space is substantially wider at said plate than at said open side thereof and (f) a compliant thermally conductive filler material fills around said tubing between said tubing and said plate and between said tubing and said plate support along the width of said third side of said space provided by said plate, (g) whereby said plate is cooled by conduction of heat to said tubing and absorbs radiated heat from said room and (h) means providing a direct thermal conduction barrier between said tubing and said finished surface covering, (i) whereby excessively low finished surface covering temperature immediately adjacent said tubing is avoided.

3. In a hydronic heating system having a source of supply water that may be hot for heating or cold for cooling and a reservoir of return water that may be less hot for heating or less cold for cooling, a supply water line from said source, a return water line to said reservoir and one or more heating loops for heating or cooling loops for cooling through which water flows from said supply line to said return line, said loop including an element that is a length of tubing that conducts water from said supply line to said return line and said length of tubing is mounted in a floor, wall or ceiling of a room that is heated or cooled by said system by RFH or RFC or RWH or RWC or RCFH or RCC, the improvement comprising:

(a) a highly thermally conductive plate having a radiation surface mounted in said room floor or wall parallel thereto, and covered by said room finished floor, wall or ceiling, herein called said finished surface covering thereof, (a) a highly thermally conductive radiation plate having length, width and thickness and a radiating surface, mounted in said room floor, wall or ceiling, parallel thereto and covered by said room finished floor, wall or ceiling, herein called said finished surface covering thereof, (b) a plate support of two spaced apart boards having surfaces and edges providing between adjacent edges thereof an elongated space in which said length of tubing is held against said plate in intimate thermal contact therewith between said plate and said finished surface covering, (c) said elongated space being defined by said boards adjacent edges, said plate and an open side, (d) said tubing being inserted into said space through said open side thereof, (e) said boards adjacent edges are undercut so that said space is substantially wider at said plate than at said open side thereof and (f) a compliant thermally conductive filler material fills around said tubing between said tubing and said plate and between said tubing and said plate support along the width of said third side of said space provided by said plate, (g) whereby said plate is heated by conduction of heat from said tubing and radiates heat to said room when hot water is fed to said tubing and said plate is cooled by conduction of heat to said tubing and absorbs radiated heat from said room when cold water is fed to said tubing and (h) means providing a direct thermal conduction barrier between said tubing and said finished surface covering, (i) whereby excessively high finished surface covering temperature immediately adjacent said tubing is avoided during heating and excessively low finished surface covering temperature is avoided during cooling.

4. A hydronic heating system as in claim 1 wherein:
(a) said two spaced apart board lengths are substantially the same as said plate length.

5. A hydronic heating system as in claim 1 wherein:
(a) said two spaced apart board thicknesses are substantially the same as the outer diameter of said tubing.

6. A hydronic heating system as in claim 1 wherein:
(a) said undercuts are stepped so that said space widens towards said plate.

7. A hydronic heating system as in claim 1 wherein:
(a) said undercuts are tapered so that said space widens from said open side thereof towards said plate.

8. A hydronic heating system as in claim 1 wherein:
(a) said adjacent edges are slightly tapered from said open side of said space toward said plate to at least half of said board thickness, where said undercuts begin.

9. A hydronic heating system as in claim 1 wherein:
(a) said undercuts are bevels along said adjacent edges of said two spaced apart boards.

10. A hydronic heating system as in claim 1, 2 or 3 wherein:
(a) said compliant filler material is silicone rubber.

11. A hydronic heating system as in claim 1, 2 or 3 wherein:
(a) said plate is metal.

12. A hydronic heating system as in claim 1, 2 or 3 wherein
(a) said boards are wood.

13. A hydronic heating system as in claim 1 wherein;
(a) said plate material is aluminum,
(b) said compliant filler material is silicone rubber and
(c) said boards are wood.

14. In a hydronic heating system for heating and cooling a room having a source of hot supply water and a reservoir of cooler return water, a supply water line from said source, a return water line to said reservoir and one or more loops through which water flows from said supply line to said return line for heating or cooling said room, said loop including an element that is a length of tubing that conducts water from said supply line to said return line and a radiation plate mounted in the floor, wall or ceiling of the room for RFH, RFC, RWH, RWC, RCH and, respectively, the method of installing said system including the steps:

(a) providing modular panels each of a highly thermally conductive radiation plate having length, width and thickness and two spaced apart boards that provide between adjacent edges thereof an elongated space for holding a length of said tubing adjacent said plate, said elongated space having an elongated open side for inserting said length of tubing into said space, said boards adjacent edges being undercut so that said space is substantially wider at said plate than at said open side, (b) attaching said modular panels to said floor, wall or ceiling of said room with said elongated spaces thereof aligned end to end and said open side thereof facing the inside of said room, (c) inserting a compliant thermally conductive filler material in said elongated space through said open side thereof, (d) inserting said tubing into said space through said open side thereof so that said filler material fills said undercut against said plate and said tubing, (d) inserting a thermal barrier over said inserted tubing and (e) mounting a finished floor, wall or ceiling on said panels over said thermal barrier, (f) whereby excessively high finished floor, wall and ceiling surface temperature immediately adjacent said tubing in avoided during heating and excessively low finished floor, wall and ceiling surface temperature is avoided during cooling.

15. The method as in claim 14 wherein:
(a) said filler material is compliant and allows some movement of said tubing in said elongated space.

16. The method as in claim 15 wherein:
(a) said modular unit is rigid and dimensionally stable and said filler is compliant and distorts under force.

* * * * *